June 29, 1937.  P. J. FREEMAN  2,085,647
VEHICLE WHEEL
Filed Feb. 11, 1936
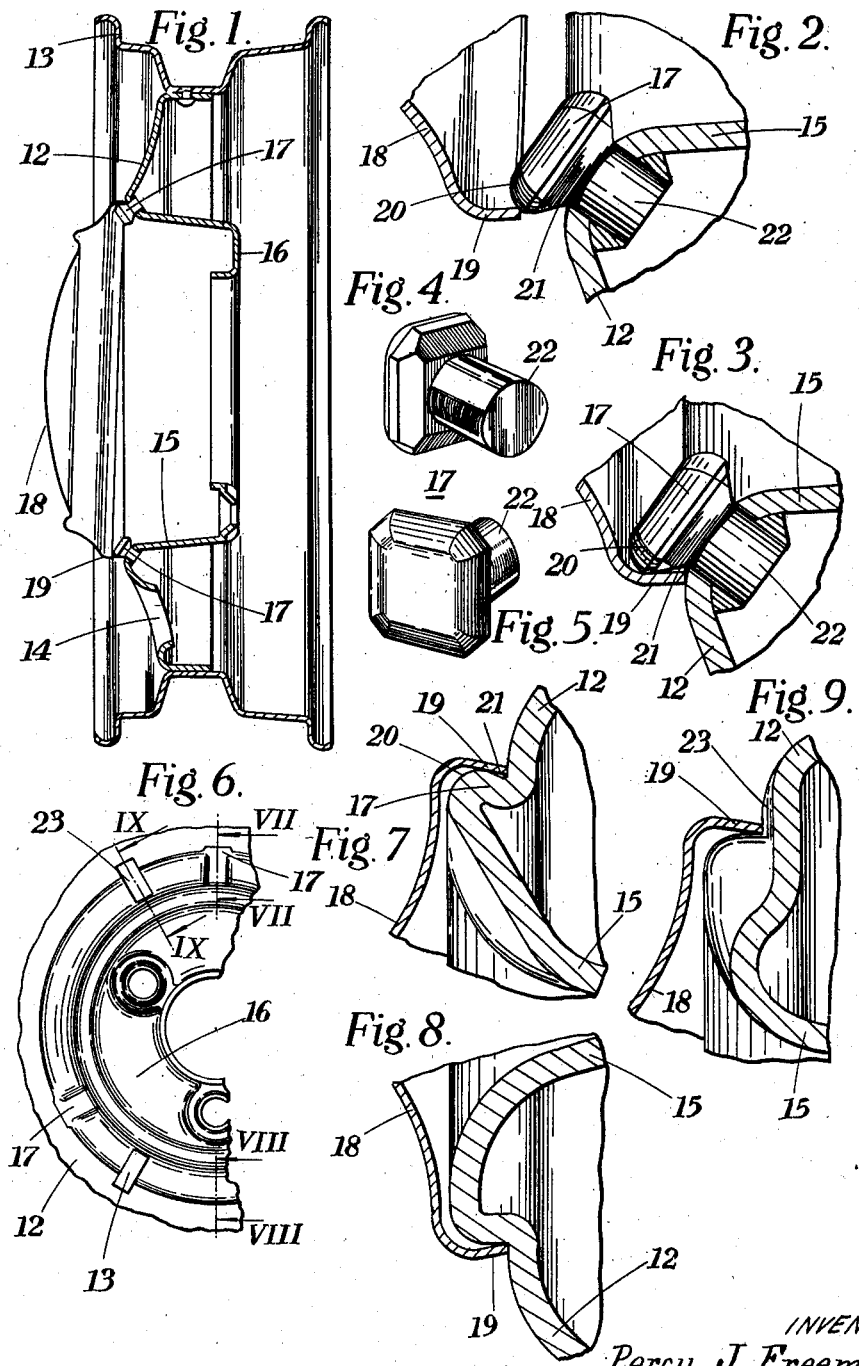
INVENTOR
Percy J. Freeman
BY
Mawhinney & Mawhinney
ATTORNEYS.

Patented June 29, 1937

2,085,647

UNITED STATES PATENT OFFICE 2,085,647

VEHICLE WHEEL

Percy John Freeman, Darlaston, England, assignor to Rubery, Owen & Company, Limited, South Staffordshire, England Application February 11, 1936, Serial No. 63,431
In Great Britain June 26, 1935

3 Claims. (Cl. 301—108)

This invention relates to detachable wheels for motor-vehicles, whether wire-spoke wheels, artillery wheels, or disc-type wheels with or without holes provided therein to leave spoked portions.

The main object of the invention is to provide in a very inexpensive manner for the rapid and secure attachment thereto of a detachable hub cover or cap.

As is well known, many wheels have a relatively large hub portion or flange encircling the bolts or other means by which the wheel is secured to the inner hub portion, and the securing means is in practice covered over by a detachable cap secured against the axially-outer edge of the said flange.

According to the invention, the vehicle wheel has at least two spaced, rigid projections on its axially-outer surface, the projections having rounded guiding faces and overhanging lateral faces; such that a radially-inturned flange of a detachable cap can be readily sprung over the projections and the cap firmly retained thereby adjacent the said outer surface.

The projections must be rigid. They may be independent studs welded or otherwise rigidly attached to the wheel. Or they may be integral with the wheel, being pressed out therefrom, in which case care must be taken not to pierce the metal of the wheel, or not to pierce it to such an extent that the resulting tongue will not be entirely rigid. The necessary springiness is provided by the cap, and any springiness occurring in the projections would tend to allow the cap to come loose when vibrations were set up in use.

In the accompanying drawing:—

Figure 1 is a cross section through one form of disc wheel adapted according to the invention, the cap being shown engaged with the upper projection and in position to be sprung over the lower;

Figure 2 is a fragmentary view, to a much larger scale, of the lower stud projection;

Figure 3 is a similar view, after the cap has been sprung home;

Figures 4 and 5 are perspective views of the stud projection of the preceding figures;

Figure 6 is a fragmentary elevation of the hub of a wheel, with the cap omitted, fitted with another kind of projection according to the invention; and Figures 7 to 9 are sections, to a much larger scale, as indicated by the corresponding roman characters on Figure 6, respectively.

Like numerals indicate like parts throughout the drawing.

The disc wheel illustrated has the main disc portion 12 welded or riveted to a rim 13 and formed with a series of annularly-arranged holes 14 leaving between them spoked portions. The inner ends of the spoked portions connect with the axially-outer end of a more or less cylindrical flange 15 the other end of which connects with an inner disc portion 16 by which the wheel can be secured against an associated brake drum, this cylindrical flange thus encircling the securing means. The axially-outer end of this cylindrical flange carries or has formed in it the projections 17 in question.

If only two projections are used (Figure 1) these are diametrically opposite one another; if three (Figure 6) they are preferably spaced 120° apart. For larger wheels each projection would preferably be replaced by a pair of projections beside one another, instead of relatively large projections being used.

The cap 18, which may be formed as a spinning or pressing, has a radially-inturned flange 19, preferably at its edge, the minimum diameter of which is just less than the maximum diameter of the circle through the outer faces of the projections; but there is sufficient spring in the cap to allow it to be forced over the projections, thus to be retained thereby in close contact with the outer surface of the wheel.

The flange should be radially inturned so that the minimum internal diameter thereof is between 0.012″ and 0.12″ less than the diameter of the greatest circle which will touch all the projections. Preferably the said minimum internal diameter is 0.06″ less, which corresponds to an angle of inturn, as actually shown in the drawing accompanying the specification, which is approximately 6°. The limits of inturning expressed as an angle should be between 2° and 18°.

That is to say, in the case of a flange the operative portion of which before inturning has an internal diameter which is within (plus or minus) 0.005″ of the diameter of the greatest circle which will touch all the projections, the ideal angle of inturn, as is illustrated in the drawing of the specification, is 6°. (In this case the minimum diameter of the flange when inturned is 0.06″ less than the diameter of the greatest circle which will touch all the projections.) If the said internal diameter before inturning were, say, as much as 0.01″ less than the diameter of the said greatest tangent circle, the inturning should be less, but the angle of inturn should not be less than 2°, corresponding to an inturned flange with a minimum diameter which is 0.012″ less than the diameter of the greatest circle which will touch all the projections. If the said internal diameter is relatively larger a larger inturning may be desirable, but the angle of inturn should not exceed 18°, corresponding to an inturned flange with a minimum diameter which is 0.12" less than the diameter of the greatest tangent circle to the projections.

In practice—when, for example, there are three projections—the cap is placed over two of them and then forced over the third, in the manner indicated by Figure 1. The outer edge of the third, or, if desired, of all the projections, is rounded, as indicated at 20, to facilitate this operation. The overhanging lateral faces are undercut, as shown at 21, to lie, for example, on the surface of an imaginary pyramid, cone or sphere. The lateral faces 21 are undercut slightly more than the extent to which the flange 19 is inturned, as shown clearly in Figures 3 and 7.

The projections may be independent studs welded or otherwise rigidly secured in position, as shown by Figures 1 to 5. In this example the studs are square-shaped ones, although only one of the rounded faces 20 and undercut faces 21 is used, for such symmetrical studs can be economically manufactured. The stems 22 are tapered slightly, so that when driven into the holes in the wheel they will be firmly retained in position during the welding operation.

Alternatively, the projections may be constituted by parts pressed out from the appropriate portion of the wheel, as shown by Figures 6 to 9. The metal of the wheel, however, is not pierced at all, so that the pressed out projection is entirely rigid.

Conveniently a slot or groove 23 (shown only in Figures 6 and 9) is provided on the surface of the wheel adjacent the edge of the cap to receive a screwdriver or other implement by which a light pressure can be applied to the edge of the cap to lever it off when access to the securing means for the wheel is to be provided.

In this way a detachable cap can be securely fixed against the outer surface of a vehicle wheel in a very simple manner, and the parts can be inexpensively manufactured.

What I claim as my invention and desire to secure by Letters Patent of the United States is:—

1. In combination, a wheel for a motor-vehicle, said wheel having on its axially-outer face at least two spaced projections which are independent studs welded to the wheel, said projections having a rounded guiding surface and having overhanging lateral faces, and a detachable cap having a radially-inturned flange, said flange being of a size to be readily sprung over said projections and firmly retained thereby adjacent the outer face of the wheel.

2. In combination, a wheel for a motor-vehicle, said wheel having on its axially-outer face at least two spaced projections which are rigid with the wheel, said projections having a rounded guiding surface and having overhanging lateral faces, and said projections having tapered stems driven into holes in the wheel, and a detachable cap having a radially-inturned flange, said flange being of a size to be readily sprung over said projections and firmly retained thereby adjacent the outer face of the wheel.

3. In combination, a wheel for a motor-vehicle, said wheel having at least two spaced holes in it, projections with heads of polygonal outline and with tapered stems driven into said holes and welded therein, the heads of said projections having a rounded guiding surface and having overhanging lateral faces, adjacent the axially-outer face of said wheel, and a detachable cap having a radially-inturned flange, said flange being of a size to be readily sprung over said projections and firmly retained thereby adjacent the outer face of the wheel.

PERCY JOHN FREEMAN.